United States Patent
Yousouf et al.

(10) Patent No.: US 11,650,847 B2
(45) Date of Patent: May 16, 2023

(54) AUTO-RECOVERY JOB SCHEDULING FRAMEWORK

(71) Applicant: SAP SE, Walldorf (DE)

(72) Inventors: Shenol Hulmi Yousouf, Sofia (BG); Nikolai Veselinov Neichev, Sofia (BG); Kaloyan Stefanov Nikov, Veliko Tarnovo (BG)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 17/201,225

(22) Filed: Mar. 15, 2021

(65) Prior Publication Data
US 2022/0291960 A1    Sep. 15, 2022

(51) Int. Cl.
*G06F 9/48* (2006.01)
*G06F 9/50* (2006.01)
*G06F 11/30* (2006.01)
*G06F 11/07* (2006.01)

(52) U.S. Cl.
CPC .......... *G06F 9/4887* (2013.01); *G06F 9/5072* (2013.01); *G06F 11/0715* (2013.01); *G06F 11/3051* (2013.01); *G06F 2209/486* (2013.01); *G06F 2209/505* (2013.01)

(58) Field of Classification Search
CPC .. G06F 9/4887; G06F 9/5072; G06F 11/0715; G06F 11/3051; G06F 2209/486
See application file for complete search history.

(56) References Cited

U.S. PATENT DOCUMENTS

| 11,418,381 | B2* | 8/2022 | Roy | H04L 41/0654 |
| 2008/0229142 | A1* | 9/2008 | Anand | G06F 11/1469 |
| | | | | 714/6.12 |
| 2009/0300615 | A1* | 12/2009 | Andrade | G06F 9/5066 |
| | | | | 718/100 |
| 2010/0251002 | A1* | 9/2010 | Sivasu | G06F 11/0793 |
| | | | | 714/2 |
| 2014/0101673 | A1* | 4/2014 | Klyuchevskyy | G06F 9/4881 |
| | | | | 718/106 |

(Continued)

OTHER PUBLICATIONS

U.S. Appl. No. 17/169,754, filed Feb. 8, 2021, Yousouf et al.

(Continued)

*Primary Examiner* — Benjamin C Wu
(74) *Attorney, Agent, or Firm* — Fish & Richardson P.C.

(57) ABSTRACT

The present disclosure relates to computer-implemented methods, software, and systems for an automatic recovery job execution through a scheduling framework in a cloud environment. One or more recovery jobs are scheduled to be performed periodically for one or more registered service components included in a service instance running on a cluster node of a cloud platform. Each recovery job is associated with a corresponding service component of the service instance. A health check operation is invoked at a service component based on executing a recovery job at the scheduling framework corresponding to the service component. In response to determining that the service component needs a recovery measure based on a result from the health check operation, a recovery operation is invoked as part of executing a set of scheduled routines of the recovery job. Implemented logic for the recovery operation is stored and executed at the service component.

20 Claims, 5 Drawing Sheets

(56) References Cited

U.S. PATENT DOCUMENTS

| | | | |
|---|---|---|---|
| 2015/0127804 A1* | 5/2015 | Kripalani | H04L 67/1097 |
| | | | 709/224 |
| 2016/0094483 A1* | 3/2016 | Johnston | H04L 47/827 |
| | | | 709/226 |
| 2019/0102411 A1* | 4/2019 | Hung | G06N 5/025 |
| 2020/0310928 A1 | 10/2020 | Neichev et al. | |
| 2020/0319982 A1 | 10/2020 | Rusev et al. | |
| 2021/0385124 A1* | 12/2021 | Roy | H04L 41/0803 |
| 2022/0035693 A1* | 2/2022 | Jiang | G06F 9/541 |
| 2022/0283891 A1* | 9/2022 | Bolagani | G06F 11/0724 |

OTHER PUBLICATIONS

U.S. Appl. No. 17/169,787, filed Feb. 8, 2021, Yousouf et al.
U.S. Appl. No. 17/170,105, filed Feb. 8, 2021, Yousouf et al.
U.S. Appl. No. 17/170,166, filed Feb. 8, 2021, Yousouf et al.
Cloud.Google.com [online], "Using autohealing for highly available apps" Apr. 2020, [Retrieved on Feb. 3, 2021], retrieved from: URL <https://cloud.google.com/compute/docs/tutorials/high-availability-autohealing>, 6 pages.
Pcwdld.com [online], "Agent vs Agentless Monitoring—What are the Differences & the Best Tools & Software" Mar. 2019, [retrieved on Mar. 15, 2021], retrieved from: URL <https://www.pcwdld.com/agent-vs-agentless-monitoring>, 8 pages.
Quartz-scheduler.org [online], "Quartz Job Scheduler" Nov. 2009, [retrieved on Mar. 15, 2021], retrieved from: URL<http://www.quartz-scheduler.org/>, 2 pages.
Vijayalakshmi et al. "Automatic healing of services in cloud computing environment." 2016 International Conference on Advanced Communication Control and Computing Technologies (ICACCCT), May 2016, 6 pages.

* cited by examiner

AUTO-RECOVERY JOB SCHEDULING FRAMEWORK

TECHNICAL FIELD

The present disclosure relates to computer-implemented methods, software, and systems for execution of software applications and services in a cloud environment.

BACKGROUND

Software complexity is increasing and causes changes to lifecycle management and maintenance of software applications and platform systems. Customer's needs are transforming, with increased requests for flexibility in terms of processes and landscapes, and also high availability to access software resources provided by the underlying platform infrastructure. Cloud environments may experience network connectivity disruptions, hardware failures, and other technical issues affecting responsiveness of running software applications, services, and databases. Disruptions at the cloud environments may be associated with disruptions of services provided to external entities by the databases, applications, and/or services.

SUMMARY

The present disclosure involves systems, software, and computer implemented methods for an automatic recovery job execution though a scheduling framework in a cloud environment.

One example method may include operations such as scheduling one or more recovery jobs to be performed periodically for one or more registered service components included in a service instance running on a cluster node of a cloud platform, wherein each recovery job is associated with a corresponding service component of the service instance; invoking a health check operation at a service component based on executing a recovery job at the scheduling framework corresponding to the service component, wherein the recovery job includes a set of scheduled routines for the service component; and in response to determining that the service component needs a recovery measure based on a result from the health check operation, invoking a recovery operation as part of executing the set of scheduled routines of the recovery job, wherein an implemented logic for the recovery operation is stored and executed at the service component. Other implementations of this aspect include corresponding systems, apparatus, and computer programs, configured to perform the actions of the methods, encoded on computer storage devices.

Implementations can optionally include that the recovery job can include execution parameters for the set of scheduled routines. The execution parameters can include a job interval and a delay threshold value. The delay threshold value can define a time period during which the recovery job execution awaits a response from the service component for the health check operation. The job interval can define a threshold period for invoking a subsequent recovery job corresponding to the invoked recovery job. A set of recovery jobs can form a sequence of recovery jobs scheduled for periodic execution for the service component.

In some instances, the service instance can run as a first service instance of a set of service instances of a cloud service running at multiple cluster nodes of the cloud platform. The recovery jobs scheduled for each of the set of service instances can be scheduled and executed separately at corresponding runtime environments of the multiple cluster nodes of the cloud platform.

In some instances, the service instance can include the one or more service components runs on a single virtualized runtime environment, and the scheduling framework can be deployed in the single virtualized runtime environment.

In some instances, the recovery job can include implemented logic for executing the scheduled routines at the scheduling framework. The implemented logic for executing the scheduled routines can be decoupled from the logic implemented for executing the health check operation and the recovery operation at the service component.

In some instances, the recovery job can include a recovery configuration parameter defining a number of invocations of the health check operation that result in determining that the recovery measure is needed, before invoking the recovery operation.

In some instances, logic for execution of the health check operation can be implemented at the service component.

In some instances, one or more service components can be registered at an auto-recovery job registry for monitoring of health statuses and execution of recovery operations by the scheduling framework, wherein the one or more service components include logic for execution of corrective auto-recovery measures at each corresponding service component.

In some instances, a service component from the one or more registered service components can be unregistered at the auto-recovery job registry. In some instances, in response to unregistering of a service component, scheduled recovery jobs for the service component at the scheduling framework can be deleted.

In some instances, a registered service component can be associated with a schedule for periodic monitoring for determining issues at the service component through invoking health check operations initiated from the scheduling framework.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
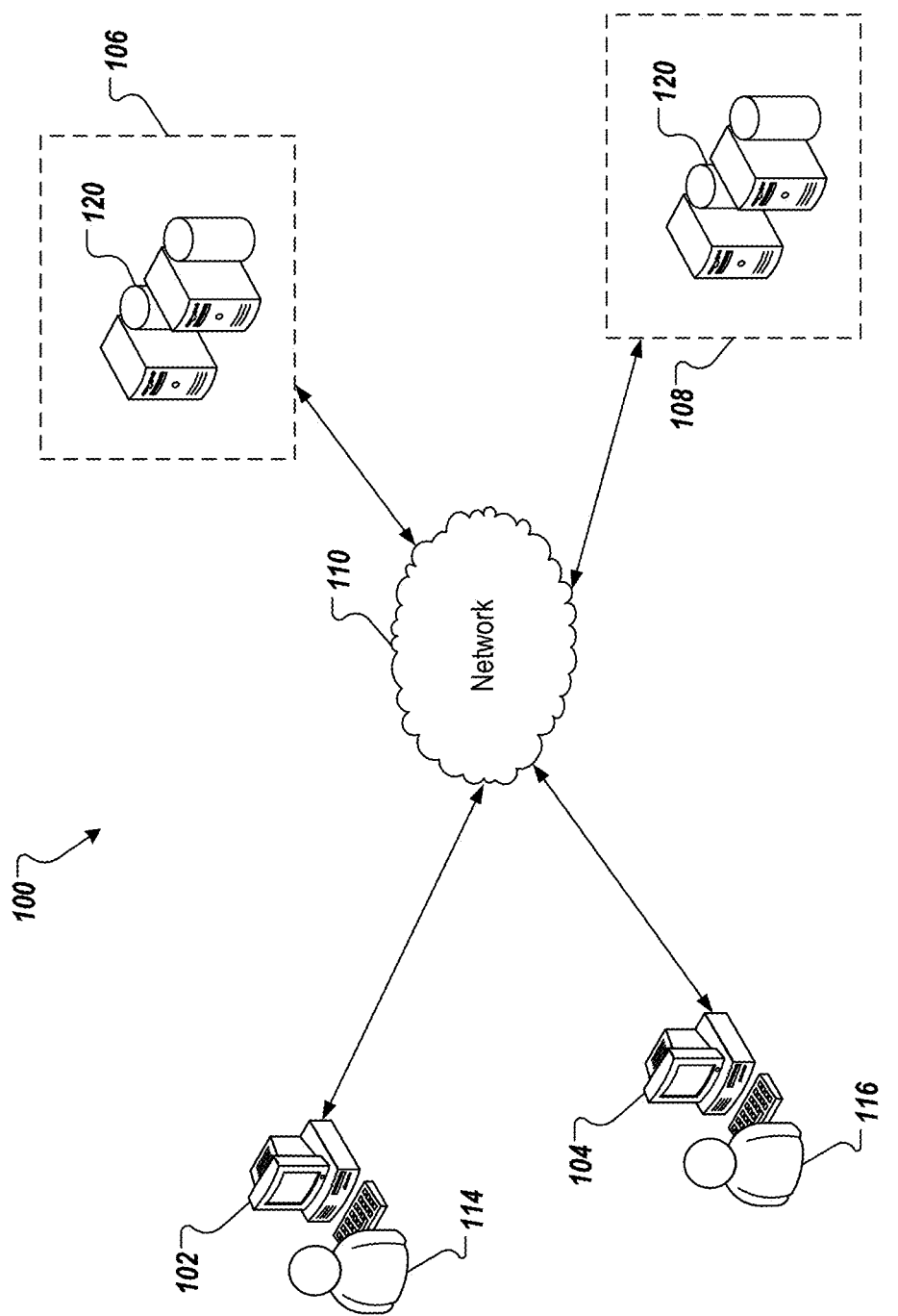
FIG. 1 illustrates an example computer system architecture that can be used to execute implementations of the present disclosure.

The present disclosure describes various tools and techniques for an automatic recovery job execution through a scheduling framework in a cloud environment.

In some instances, a cloud platform may experience disruptions in the network connectivity. For example, a disruption may be caused by a failure in the underlying hardware and/or infrastructure where the cloud platform is hosted. The disruptions may affect part of or the whole of the cloud platform. In some instances, the disruptions may affect some or all connection types associated with the cloud platform. In some instances, the disruption may be associated with issues that affect one or more cluster nodes of the cloud platform. The disruption may affect connectivity between clusters and performance of operations that affect the cloud platform as a whole. For example, because of a network connectivity issue, a determination based on responses from the cluster nodes of the cloud platform may lead to false results if there are network connectivity issues between the different cluster nodes. In such cases, based on disruptions in exchanged data, cluster nodes of a cloud platform may arrive at a split brain situation, where two or more groups of cluster nodes perform different determinations about the status and performance of the cloud platform. For example, due to a disruption in the connectivity between some cluster nodes, it may be possible that two separate leader cluster nodes are elected from the split groups of cluster nodes due to lack of connectivity between some of the node pairs.

In some instances, different issues that can affect execution of a service or a service component at a cloud platform can be identified. In some instances, the different issues can be associated with connectivity issues including inbound connections, outbound connections, and internal cloud connections, among others.

A disruption in the connectivity may be associated with an outage having a given scope and affecting connections of certain type(s) (e.g., some or all of the connection types) associated with the cloud platform. In some instances, a disruption in the network connectivity at a cloud platform may affect the execution of entities including applications, services, service components, and databases, as well as other entities that can be hosted on the cloud platform. In some of those instances, a disruption in the network connectivity may result in unavailability of services and/or communication gaps that can lead to poor performance of platform provided services.

In some instances, a scheduling framework for identifying issues that may need execution of recovery operations can be set up. In some instances, an auto-recovery registry can be instantiated to create recovery jobs associated with registered service instances based on logic defined at the scheduling framework. The created recovery jobs may be defined based on a predefined routine for invoking recovery operations (e.g., of different type and in different order) at the registered service instances. In those instances, the scheduling framework may be configured to execute those recovery jobs by invoking recovery logic implemented at the registered service instances. In some instances, the scheduling framework may host logic for triggering events for checks and execution of recovery operations based on predefined scheduling routines that can be mapped to a given service or a service component. In some instances, the execution of the checks—to determine whether there are issues that may need recovery and for the execution of corresponding recovery measures—may be performed at the affected service component. In some instances, the service component may store implemented logic for executing health checks and performing recovery operations to remedy issues and/or disruptions that may be identified based on internal evaluation checks performed at the service or service component. In those cases, the logic for scheduling checks is decoupled from the logic of the execution of operations to identify and remedy identified issues. Such decoupling provides for improved flexibility in execution of recovery logic that can be fine-tuned on service level, while providing a scheduling framework that performs more efficiently. A scheduling framework can be instantiated at each different cluster node of the cloud platform and thus focus the execution of recovery operations on a local level at multiple nodes. Such execution and triggering of operations within a cluster node rather than, for example, over a network, provide for faster processing and efficiency. Further, such execution and triggering of operation within the cluster node also supports reliability of communication between the service components and the scheduling framework that communicate with the components for the recovery jobs' execution.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM. In some instances, a service hosted on the cloud can include service components that execute specific tasks for maintaining performance of the service. Each of the instances of the service may include a corresponding instance of each service component. In some case, the service components can be associated with the lifecycle management of the service instances and/or the cloud platform as a whole.

In the cloud environment 106, a service may be running at cluster node of the cloud environment to provide end-user services, which can include, for example, services associated with requests sent through the network 110 from user 114 (or user 116) over device 102 (or device 104). The applications and the databases that are running in the cloud environment 106 may be designed, developed, executed, and maintained in relation to different customers and based on configured accounts that define process execution in relation to the applications and the database.

In some instances, the cloud environment 106 may be configured in a multiple availability zone architecture. The cloud environment 106 may be configured to include multiple availability zones where one application may include multiple instances running in corresponding multiple availability zones. The multiple availability zones may share resources of the cloud platform, and may be accessible from the outside through the same address, for example, the same uniform resource locator (URL). By executing applications, services, databases, and other examples of entities that can run on cloud platform in a multiple availability zone setup, high availability for provided services and data is maintained. Maintaining a cloud platform with multiple availability zones supports providing low-latency network connectivity between different instances of applications executed at multiple zones.

In some instances, the cloud environments 106 and/or 108 may host applications, service, databases, other, which are associated with different customers and/or accounts and may be configured to interact in a particular way.

Figure 2:
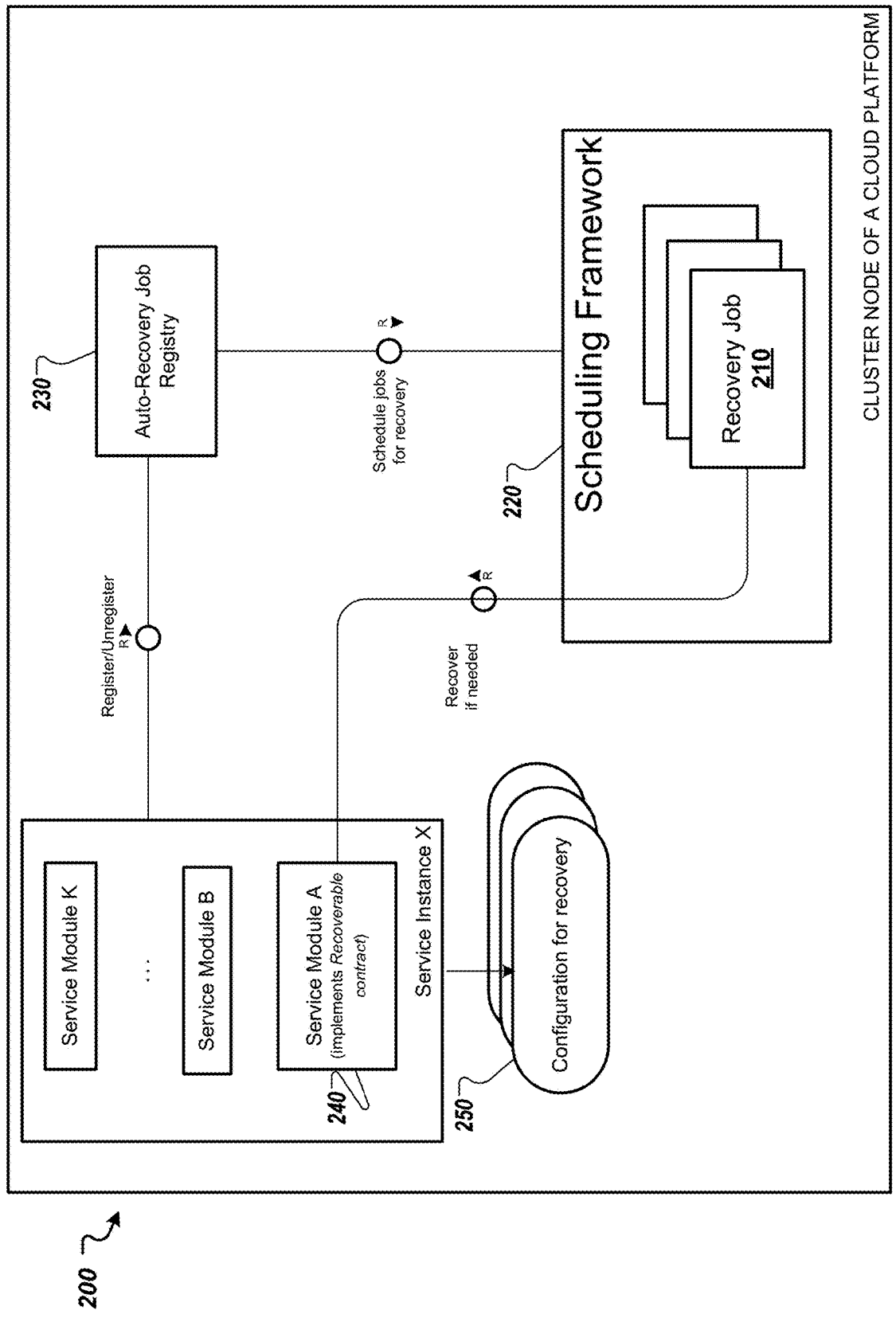
FIG. 2 is a block diagram for an example cloud platform environment configured with a scheduling framework for executing a recovery job in accordance with implementations of the present disclosure.

FIG. 2 is a block diagram for an example cluster node 200 of a cloud platform environment configured with a scheduling framework for executing a recovery job in accordance with implementations of the present disclosure.

In some instances, a cloud environment may be similar to the cloud environment 106 and/or the cloud environment 108 of FIG. 1. The cluster node 200 of the cloud environment may be configured as one physical or virtual node hosted at one physical location. In some instances, the cloud platform may also be configured in a multiple availability zone setup where multiple data centers corresponding to the presented cloud platform set up may form the whole cloud platform. In some instances, the cluster node 200 may be part of one of the availability zones of the multiple availability zone cloud platform. In some more instances, the cluster node 200 may be part of a single availability zone cloud environment.

In some instances, one entity (e.g., service instance) running at the cluster node 200 may be communicatively coupled to another entity in another node, and can consume provided services and/or data. For example, service instance X can communicate with a database (not shown) at the cluster node 200 or located externally, and can consume data stored at the database when executing implemented logic at the service instance X. In some of those examples, the service instance X can communicate with the database through service module A 240. Further examples of such communications between entities may be provided even if no connection arrows are presented at FIG. 2. In some instances, any entity running at the cloud cluster node 200 can communicate with another entity running on the same cloud platform (e.g., on another cluster node) unless there are access restrictions configured for the entities that are outside of the general network connectivity capabilities of the cloud platform.

In some instances, determining issues at service instances running at the cluster node 200 can be related to a need to execute one or more recovery operations to improve the state and/or the performance of the service instances and/or the cluster node 200 as a whole. In some instances, performance of service instances, including service instance X, at the cluster node 200 may be affected by performance and issues that may be detected at service modules included within the service instance X. To identify issues and to execute recovery operations in an automated manner, a configuration for recovery operations 250 can be stored for each or some of the service modules of a service instance at the cluster node 200. The execution of recovery operations can be performed at an affected service module by an issue and a corresponding recovery operation can be invoked to remedy the issues.

In some instances, execution of recovery operations can be performed based on scheduled routines in the form of scheduled recovery jobs that define a sequence of operations that can be executed to invoke execution of corresponding actions and/or measures at an affected service instance and/or a service module (e.g., service module A 240). The configurations for an execution of a recovery can be defined and stored at a file storage or a database storage external to the service instance X or internally to the service instance X. In some cases, the configuration for recovery 250 can be stored externally to the service instance X, but still on or within the cluster node 200. The configuration for recovery 250 can include parameter values for different parameters associated with a recovery execution.

In some instances, a service module part of the service instance X can be registered for execution of scheduled routines that trigger logic for identifying and remedying issues at the service module. By registering a service module (or component) for execution of scheduled routines through a scheduling framework, the service module can automatically receive request to determine their state and identify needs to execute recovery operations to remedy issues, such as network connectivity outages.

In some instances, the service module A 240 can request to register for receiving scheduled requests to evaluate its state through a scheduling framework 220. In some instances, the scheduling framework 220 may be configured on the cluster node 200 where recovery jobs, such as recovery job 210, can be maintained and executed to trigger invocation of logic implemented at a service module, such as service module A 240.

In some instances, service module A 240 can send a request to register at the auto-recovery job registry 230. The request to the auto-recovery jobs registry can include information for the service module A and configuration details for the requested recovery monitoring. In some instances, the request to register at the auto-recovery job registry include a record defining configuration parameters for scheduling the recovery job 210 at the scheduling framework. In some instances, in response to receiving a request to register the service module A 240, the auto-recovery job registry can schedule job(s) for recovery and store the schedule recovery jobs at the scheduling framework 220. In some instances, when a job for recovery is scheduled, the scheduling can be defined according to a scheduled sequence of executions of instances of a single recovery job that is executed periodically. For example, the instances of a single recovery job can be executed according to the configuration parameters for the recovery. In some examples, each recovery job instance can be executed every five (5) minutes, every day at 5 pm, every hour, other time periods or intervals, or in response to events.

In some instances, once recovery jobs are stored at the scheduling framework 220 for a given service module, such as service module A 240, a recovery job (or an instance of a recovery job) can be executed and a corresponding request according to the scheduled routine can be sent from the recovery job executed at the scheduling framework 220 to the service module A 240. In some instances, the scheduling framework 220 manages the lifecycle of recovery jobs created from the auto-recovery job registry in response to registering service instances. In some instances, based on execution of a first instance of a recovery job at the scheduling framework that corresponds to service module A 240, a health check operation can be invoked at the service module A 240 to determine whether there is a need for a recovery measure to be taken by the service component A 240. In some instances, when determining that service module A 240 needs a recovery measure, it can also be determined whether service module A 240 is in such a state that it can execute a recovery operation that can remedy, or at least improve, the state of the service module.

In some instances, when a health check operation is executed, different error conditions can be identified. For example, it can be determined that the service module 240 cannot connect to a database to receive data to perform service logic. In another example, it can be determined that service module A 240 cannot communicate with a peer service module that runs on another cluster node of the cloud platform. In yet another example, it can be determined that other instances corresponding to the service instance X cannot be contacted from the service module A 240, for example, due to a network outage.

In some instances, in response to determining that service module A 240 needs a recovery measure based on a result from the health check operation executed at the service module A 240, a recovery operation can be invoked as part of the execution of the scheduled routines of the recovery job 210 scheduled at the scheduling framework 220. In some instances, the implemented logic for the recovery operation can be stored and executed at the service module A 240, while the scheduled recovery job 210 include only logic for invoking a recovery operation to address needs for recovery of the service module A 240.

Figure 3:
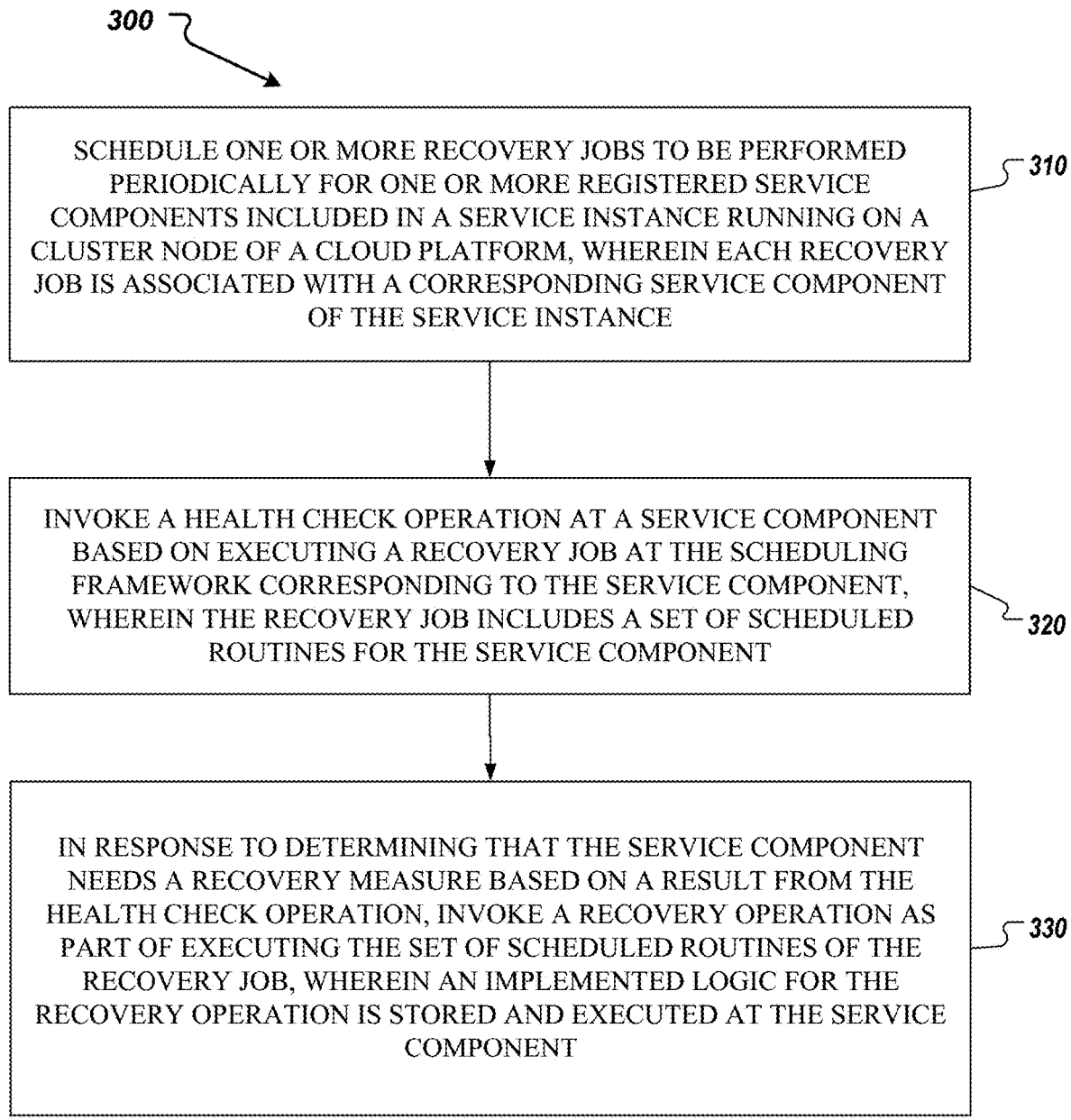
FIG. 3 is a flowchart for an example method for executing a recovery job at a scheduling framework at a cloud platform in accordance with implementations of the present disclosure.

FIG. 3 is a flowchart for an example method 300 for executing a recovery job at a scheduling framework in a cloud environment in accordance with implementations of the present disclosure.

In some instances, applications, services, database, among other entities that can be hosted in a cloud environment, may provide services for consumption within a cloud platform or outside of the cloud platform. Entities running on the cloud platform may execute logic that include processing received requests and providing resources or data, dispatching received requests to other entities, querying database entities, accessing external resources to gather data or to request services, among other examples of implemented processing logic at running entities on the cloud platform. For example, an application may execute processes and access a database to provide services to end-users. In order to provide services with high availability, the entities running on the cloud platform have to be accessible from the outside, be able to access external services, resources, or other entities, and be able to communicate with other entities running within the same cloud platform. Thus, if a service experience issues, such as network connectivity issues, quality of the services provided by entities running on the cloud platform may be affected. To maintain applications, services, and database(s) having a requirement for high availability, a scheduling framework can be set up at the cloud platform to automatically execute scheduled jobs according to a scheduled routine to determine whether recovery measures are necessary and to invoke logic at service modules part of an instance of an application or a service within the cloud platform to perform a recovery operation that can support recovery from the identified issue. The example method 300 may be executed at a cloud platform that may be configured to implement a scheduling framework to schedule and execute recovery job for different service modules of an instance of a service or an application. The scheduling framework may correspond to, or be substantially equivalent to the scheduling framework 220 described in FIG. 2.

At 310, one or more recovery jobs are scheduled to be performed periodically for one or more registered service components included in a service instance. The service instance can be running on a cluster node of a cloud platform. In some instances, multiple service instances may be running on the cluster node. In some instances, the cloud platform may include multiple cluster nodes and one service may be executed through multiple corresponding instances that can run at different cluster nodes of the cloud platform. In some instances, the service instance can include multiple service components. A service component can be a component that is specialized in execution of a particular task, for example, a monitoring service for the state of clusters within the cloud platform, a communication manager between different service instances, or other example services that can run as part of a service instance. A recovery job from the recovery jobs can be associated with a corresponding service component of the service instance.

In some instances, a service component of a service instance can be registered at the scheduling framework to receive scheduled requests based on a defined schedule routine for executing a recovery job. One recovery job can include multiple sub-tasks, and those multiple sub-tasks can be executed in a sequence at the service component. In some instances, the sub-tasks may be defined as scheduled requests that invoke execution of logic at the service component.

In some instances, the one or more service components can be registered at an auto-recovery job registry. In some instances, the auto-recovery job registry can be similar to the auto-recovery job registry 230 of FIG. 2. The auto-recovery job registry can be set up for storing data for registered service components of service instances running at the cluster node of the cloud platform. The auto-recovery registry can store data for the registered service components and can serve as a mediator between the service components and the scheduling framework for scheduling and unscheduling of recovery jobs with the corresponding configuration. In some instances, the one or more service components implement logic for execution of corrective auto-recovery measures at each corresponding service component.

In some instances, a service instance can be registered at the scheduling framework and a schedule for subsequent periodic execution of recovery jobs can be setup. A schedule for subsequent executions includes multiple instances of recovery jobs, where a time period may be defined between the execution of a first instance of a recovery job and a second instance of a recovery job. Instances of a recovery job may correspond or be substantially the same for a service component. In some instances, a registered service component can be associated with a schedule for periodic monitoring for issues at the service component. The determination of issues at the service component can be performed through execution of health check operations that can be initiated (or invoked) from the scheduling framework.

In some instances, a recovery job can include execution parameters for the scheduled routines (e.g., defined subtasks) included in the recovery job. The parameters can include a job interval and a delay threshold value, among others. The delay threshold value can define a time period that the recovery job execution awaits a response from executing the health check operation at the service component. For example, the recovery job can define a time threshold period of two (2) seconds as a delay threshold value. The time threshold period may be monitored for receiving a response based on sending a request from the scheduling framework to the service component, and if no response is received within the threshold period, then a subsequent repetitive request corresponding to the one with no response received within the time period is executed on the next scheduled period. In some cases, the delay threshold value can be defined as an agreed delay response time for the service instance that includes the service component. In some instances, the job interval can define a threshold period for invoking a subsequent recovery job corresponding to the invoked recovery job.

In some instances, the service instance can run as a first service instance of a set of service instances of a cloud service running at multiple cluster nodes of the cloud platform. In some instances, recovery jobs scheduled for each of the set of service instances are scheduled and executed separately at corresponding runtime environments of the multiple cluster nodes of the cloud platform. In those instances, a first recovery job can be executed in association with a first service component of a first service instance within one cluster node, and a second recovery job can be executed in association with a second service component corresponding to the first service component, where the second service component is part of a second service instance corresponding to the first service instance. The first service instance and the second service instance can run at different cluster nodes of the cloud platform. In some instances, the different cluster nodes may represent different data centers that can define the cloud platform as a multi-availability zone cloud platform. In some instances, a cluster node may be a physical or a virtual machine, or a virtual containerized environment that provides software and hardware resources for executing platform services. In some other instances, the cluster node may be part of a single availability zone cloud environment.

In some instances, the one or more service components of the service instance can run on a single virtualized runtime environment, and particularly wherein the scheduling framework is deployed in the single virtualized runtime environment.

At 320, a health check operation at a service component is invoked based on executing a scheduled recovery job at the scheduling framework. The scheduled recovery job that is executed corresponds to the service component and includes scheduled routines for the service component.

In some instances, based on invoking the health check operation at the service component, it can be determined that a network outage is affecting the performance of the service component. That determination can be performed at the service component that has logic to execute the health check operation and to determine a result. In some instances, the result can define an issue that is determined. For example, the issue can be a network outage or another connectivity issues. In some instances, a network outage can be identified to comprise determining a limit of connectivity between entities (e.g., service instances, service components, or applications) running at different network segments of the cloud platform. In other instances, a network outage can be identified by determining a limited connectivity between entities running at the cloud platform and entities running at different cloud platforms connected to the first cloud platform. In some other instances, a network outage can be identified by determining a limited connectivity between service instances at the cloud platform and external resources to the cloud platform accessible over the Internet.

In some instances, in response to determining that a network outage is affecting the performance of a service component based on a result of an executed health check operation at the service component, a health check operation can be invoked from the scheduling framework for a second execution after a predetermined time period. In some cases, the second execution can be part of the scheduled routines defined for the recovery job that is executed at the scheduling framework. In some cases, it can be determined that the network outage is maintained after receiving a result of the second execution. Then, the execution of the recovery job at the scheduling framework can proceed with the invocation of the recovery operation at the service component.

At 330, in response to determining that the service component needs a recovery measure based on a result from the health check operation, a recovery operation as part of executing the scheduled routines of the recovery job is executed. The recovery operation can be invoked by the recovery job being executed, and the service component can store an implemented logic for executing the recovery operation. The implemented logic for executing the scheduled routines of the recovery job can be decoupled from the logic implemented for executing the health check operation and the recovery operation at the service component.

In some instances, based on the scheduling framework and the provided tools and techniques to schedule and execute recovery job, contracts for execution of recovery operations can be defined between a service component and the scheduling framework. A contract can be defined to include scheduled routines for the service component at the scheduling framework and corresponding implemented logic for operations for determining health status and executing recovery tasks at the service component. The scheduled routines included as part of the contract defined at the scheduling framework may include defined monitoring tasks that invoke corresponding execution logic at the service component. In those instances, the logic for executing operations associated with determining a health status of a service component and performing corresponding recovery operations is decoupled from logic for triggering execution of such operations. In some instances, the service component may not include logic for triggering recovery job, and may instead rely on the invocations received from the scheduling framework. In some instances, since the implementation of the logic for determining the health status at the service modules and executing recovery operations by the service component is decoupled from the logic of invoking it, multiple different scenarios for handling recovery of issues at the service component can be implemented in a more robust, flexible, and easy to modify configuration that can be handled on the level of the logic of the service component. In addition, those scenarios can be different for different service components part of a service instance and may correspond to different rules and routines that address technical requirement for the service level execution. The implementation of recovery operation(s) at the service component as corrective measure(s) may be specific technical instructions that correspond to characteristics of the service component.

In some instances, a service component from the one or more registered service components can be unregistered at the scheduling framework. In some instances, the registered service component is associated with a stored entry at an auto-recovery job registry that tracks data for registered service components for the services provided by the scheduling framework. In some instances, in response to unregistering the service component, scheduled recovery jobs for the service component can be deleted from the auto-recovery job registry.

Figure 4:
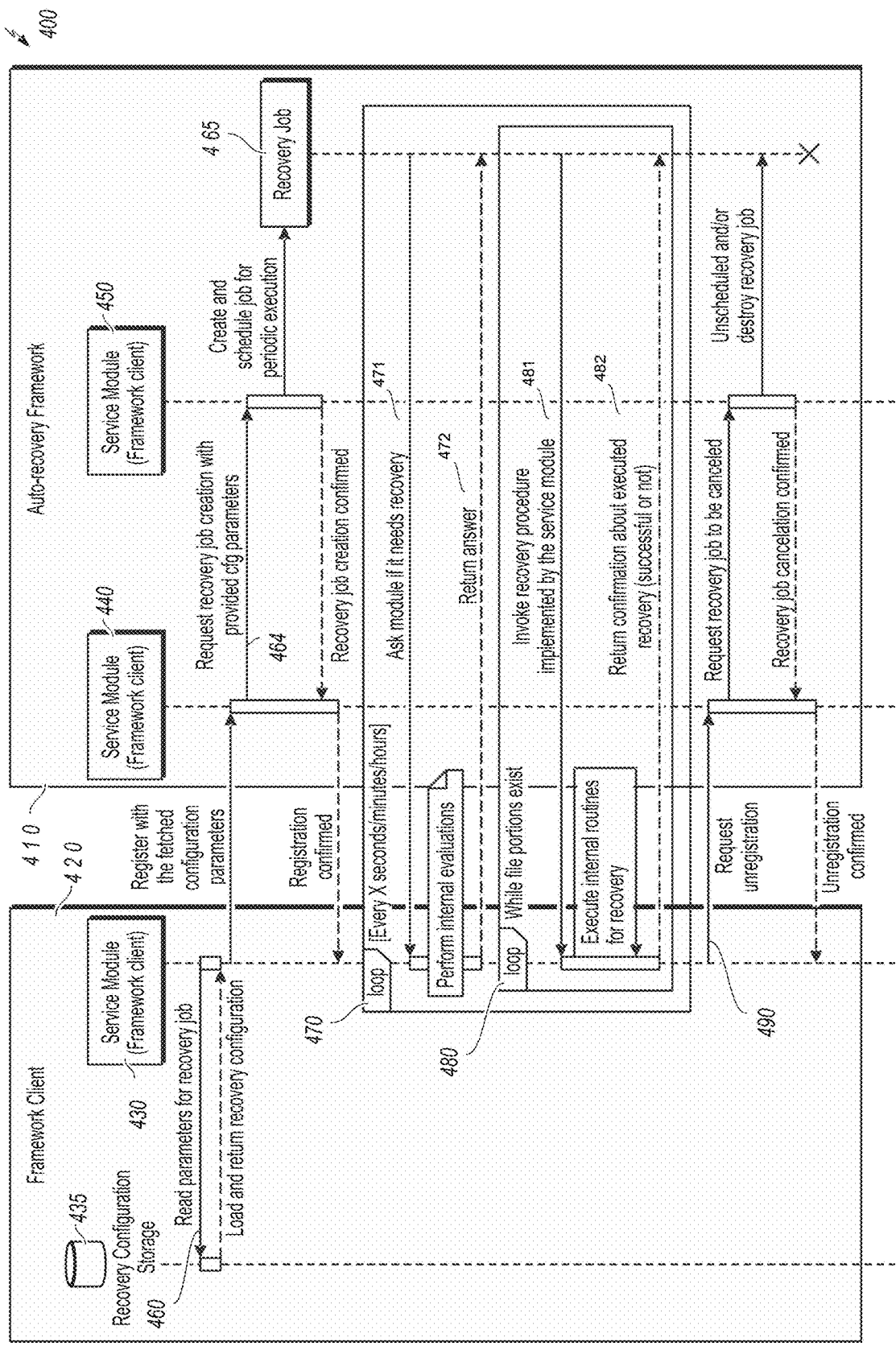
FIG. 4 is a block diagram for an example method executing a recovery job at a scheduling framework in a cloud environment in accordance with implementations of the present disclosure.

FIG. 4 is a block diagram for an example method 400 for executing a recovery job at a scheduling framework in accordance with implementations of the present disclosure. In some instances, the example method 400 may be executed at the cluster node 200 of the cloud platform of FIG. 2. In some instances, a scheduling framework 450 (e.g., as described in FIG. 2 and FIG. 3) may be set up at the cloud cluster node to schedule recovery job that can trigger execution of corresponding operations at different service components of service instances running at the cluster node. In some instances, based on triggering a health check operation at a service component included of a service instance running on the cluster node of the cloud platform, a status or an indication (e.g., output result) of an accessibility level of the service component can be determined. For example, a connectivity status including inbound connections, outbound connections, and internal connections for the service component can be determined.

In some instances, the scheduling framework may be set up as part of an auto-recovery framework 410 that also includes an auto-recovery job registry 440. The auto-recovery framework 410 can run on the cluster node of the cloud platform where a client 420 of the auto-recovery framework 410 is running. The client 420 can be a framework client including a service component 430 that is registered at the auto-recovery framework 410. The service component 430 may be registered for receiving scheduled routines from the scheduling framework 450 based on configured parameters from executing recovery jobs. In some instances, the service component 430 may store parameters for executing recovery jobs at a recovery configuration storage 435. For example, the configured parameters may be stored at the recovery configuration storage 435 in response to a received user input in association with registering the service component for receiving services from the auto-recovery framework 410.

In some instances, the service component 430 may be similar to the service component 240 of FIG. 2 and the described service components in the description of FIG. 3. In some instances, the service component may be a software component implementing logic for a specific tasks execution.

At 460, the service component 430 reads parameters for a recovery job from the recovery configuration storage 435. The recovery configuration storage 435 includes records for defined parameters for a recovery job. For example, a record of the recovery configuration storage includes information about parameters that can include a delay threshold interval, number of occurrences for executing a recovery job, a job interval (e.g, time interval such as one (1) minute), or other example job schedule parameters. The recovery configuration storage loads the read parameters and returns those in a response to the service component. The recovery configuration storage 435 can provide the response as a recovery configuration that can be provided to the auto-recovery framework 410 to register the service component 430.

At 462, the service component 430 requests to register the service component 430 at the auto-recovery jobs registry 440. The request for registering can include the fetched configuration parameters for recovery jobs that can be executed by the auto-recovery framework after the registration of the service component 430. The auto-recovery jobs registry 440 can request creation of a recovery job(s) at the scheduling framework 450 by providing the received configuration parameters. The scheduling framework 450 can create and schedule a recovery job 465 for a periodic execution. In some instances, the recovery job 465 can be similar to the recovery job 210 of FIG. 2.

In some instances, in response to successful creation of a recovery job by the scheduling framework 450, a confirmation response can be provided from the scheduling framework 450 through the auto-recovery jobs registry 440 and to the service component 430. The auto-recovery jobs registry 440 may communicate directly with the service module 430 to provide a confirmation response. In some other instances, the scheduling framework 450 may communicate directly with the service component 430 to provide the notification.

At 470, based on the registration of the service component 430 and the creation of the recovery job 465, at predefined intervals (e.g., every X seconds/minutes/hours, once within every 5 minutes, every other day, other) an instance of the recovery job 465 is executed and based on the execution, a request (471) is sent from the recovery job 465 to the service component 430 to determine whether a recovery is needed. In response to the received request, the service component can perform an internal evaluation. In some instances, the internal evaluation can include executing a health check operation to determine a health status of the service component 430. The determined result from the executed internal evaluation can be provided (at 472) to the scheduling framework 450. In some instances, the provided answer from the service component can identify an issue or an error condition type that may require execution of a recovery operation. For example, the provided answer may define that the service component 430 cannot establish a connection to a database running at the cluster node or externally, that there is a connectivity issue between the service instance that the service component 430 is a part of, that there is a connectivity issue between the cluster node where the service component 430 is running and other cluster nodes of the cloud platform, that there is limited access to resources at a file system or over the Internet.

At 480, it can be determined that the service component 430 needs recovery measures based on the response provided from the performed internal evaluations. In some instances, the scheduled instance of the recovery job 465 that was running initiates a consecutive request to the service component 430 to invoke a recovery operation (or procedure) that is implemented at the service component 430. The service component 430 can execute the internal routines implemented for the invoked recovery operation and can return (at 482) a confirmation including an indication of the result of the execution of the recovery operation (e.g., successful, not successful). In some instances, after execution of a recovery operation, a scheduled recovery job continues to run with the scheduled for invoking subsequent recovery operations. The subsequent invoking of recovery operations—including a health check operation and a subsequent recovery operation—may not be based on an outcome of a previously executed operation—either successful or unsuccessful. In some instances, the recovery operation invocation can be defined as a two-step process, where as a first step, logic at a service component is invoked to determine whether a recovery operation is needed (e.g., through invoking a health check operation), and as a second step, a recovery operation is triggered in response to determining that the recovery operation is needed. In some of those instances, a recovery operation may not be invoked before a determination that a recovery operation is needed is made.

In some instances, after the execution of the request to determine whether a recovery is needed sent during the execution of the instance of the recovery job at the scheduling framework, it can be determined that the service component 430 does not require recovery measures. In response to that, the scheduling framework can execute omit to request execution of a recovery operation as part of the recovery job, and execute a subsequent recovery job based on the defined schedule for those execution.

At 490, the service component 430 can request to be unregistered from the auto-recovery framework 410. In some instances, the request to unregister may be received at the auto-recovery jobs registry 440 or may be received and processed at the scheduling framework 450 (not shown on FIG. 4). In response to receiving the request 490, the auto-recovery jobs registry 440 can request to cancel the scheduled job(s) at the scheduling framework 450. In some instances, the scheduling framework 450 can destroy a created recovery job and to stop execution of already scheduled recovery jobs. Once the recovery jobs are canceled or destroyed, the scheduling framework 450 can confirm the recovery job cancelation to the auto-recovery jobs registry 440. In some instances, the auto-recovery jobs registry 440 can delete a corresponding record associated with the service component 430 in response to the request to unregister at 490. A confirmation from the auto-recovery jobs registry 440 (or from the scheduling framework 450 directly) can be received by the service component 430.

Figure 5:
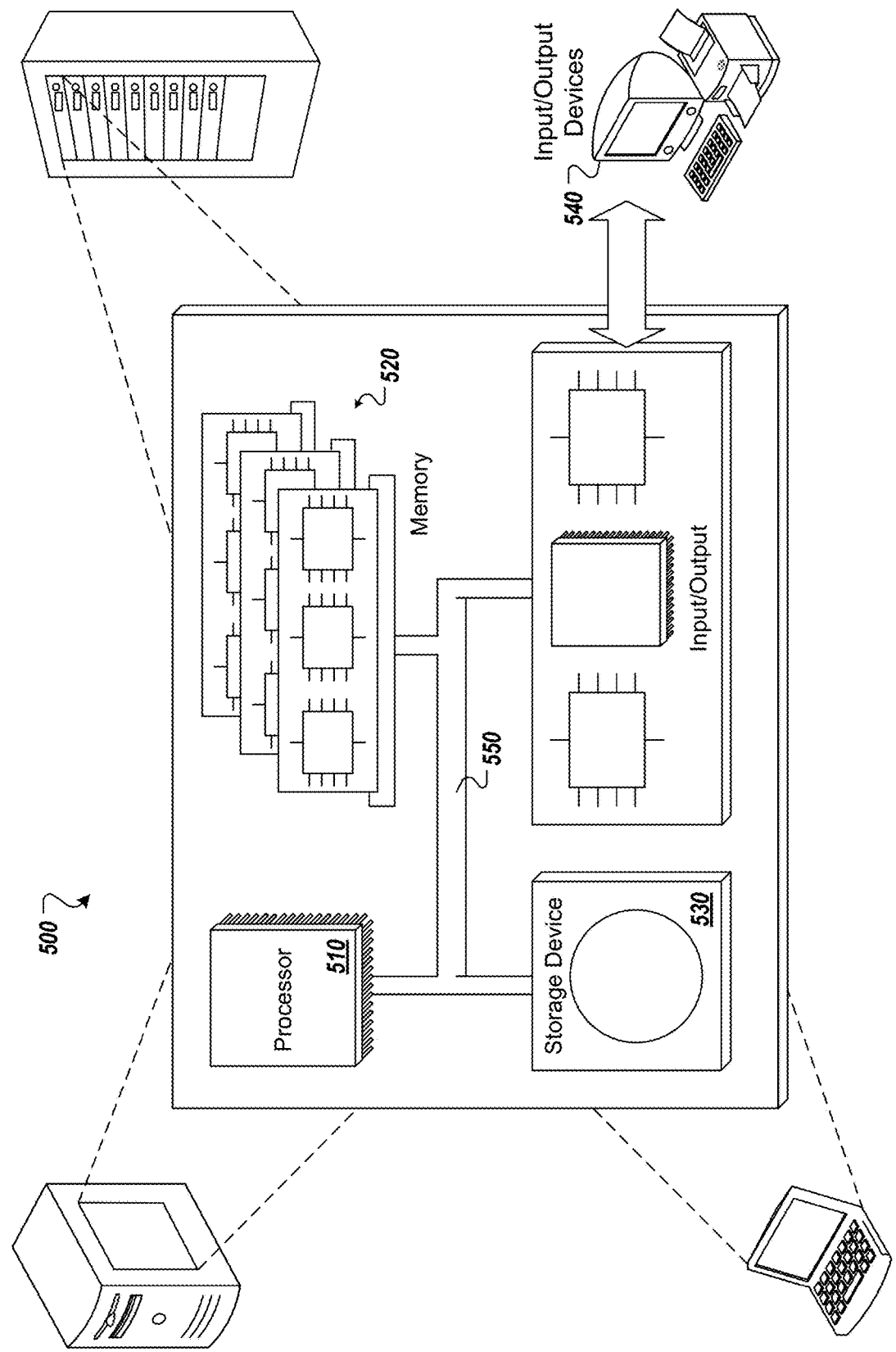
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, and 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Example 1. A computer-implemented method for executing a recovery job at a scheduling framework, the method comprising: scheduling one or more recovery jobs to be performed periodically for one or more registered service components included in a service instance running on a cluster node of a cloud platform, wherein each recovery job is associated with a corresponding service component of the service instance; invoking a health check operation at a service component based on executing a recovery job at the scheduling framework corresponding to the service component, wherein the recovery job includes a set of scheduled routines for the service component; and in response to determining that the service component needs a recovery measure based on a result from the health check operation, invoking a recovery operation as part of executing the set of scheduled routines of the recovery job, wherein an implemented logic for the recovery operation is stored and executed at the service component.

Example 2: The method of Example 1, wherein the recovery job includes execution parameters for the set of scheduled routines, the execution parameters including a job interval and a delay threshold value, wherein the delay threshold value defines a time period during which the recovery job execution awaits a response from the service component for the health check operation, and wherein the job interval defines a threshold period for invoking a subsequent recovery job corresponding to the invoked recovery job, and wherein a set of recovery jobs form a sequence of recovery jobs scheduled for periodic execution for the service component.

Example 3: The method of Example 1 or 2, wherein the service instance runs as a first service instance of a set of service instances of a cloud service running at multiple cluster nodes of the cloud platform, and wherein recovery jobs scheduled for each of the set of service instances are scheduled and executed separately at corresponding runtime environments of the multiple cluster nodes of the cloud platform.

Example 4: The method of Example 1, 2, or 3, wherein the service instance including the one or more service components runs on a single virtualized runtime environment, and wherein the scheduling framework is deployed in the single virtualized runtime environment.

Example 5: The method of Example 1, 2, 3, or 4, wherein the recovery job includes implemented logic for executing the scheduled routines at the scheduling framework, and wherein the implemented logic for executing the scheduled routines is decoupled from the logic implemented for executing the health check operation and the recovery operation at the service component.

Example 6: The method of Example 1, 2, 3, 4, or 5, wherein the recovery job includes a recovery configuration parameter defining a number of invocations of the health check operation that result in determining that the recovery measure is needed, before invoking the recovery operation.

Example 7: The method of Example 1, 2, 3, 4, 5, or 6, wherein logic for execution of the health check operation is implemented at the service component.

Example 8: The method of Example 1, 2, 3, 4, 5, 6, or 7, wherein the one or more service components are registered at an auto-recovery job registry for monitoring of health statuses and execution of recovery operations by the scheduling framework, wherein the one or more service components include logic for execution of corrective auto-recovery measures at each corresponding service component.

Example 9: The method of Example 1, 2, 3, 4, 5, 6, 7, or 8, wherein a service component from the one or more registered service components is unregistered at the auto-recovery job registry, and wherein the method further comprises, in response to unregistering of a service component, deleting scheduled recovery jobs for the service component at the scheduling framework.

Example 10: The method of Example 1, 2, 3, 4, 5, 6, 7, 8, or 9, wherein a registered service component is associated with a schedule for periodic monitoring for determining issues at the service component through invoking health check operations initiated from the scheduling framework.

Similar operations and processes as describes in Examples 1 to 10 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 10 may also be contemplated.

What is claimed is:

1. A computer-implemented method for executing a recovery job at a scheduling framework, the method comprising:
scheduling one or more recovery jobs to be performed periodically for one or more registered service components included in a service instance running on a cluster node of a cloud platform, wherein each recovery job is associated with a corresponding service component of the service instance;
invoking a health check operation at a service component based on executing a recovery job at the scheduling framework corresponding to the service component, wherein the recovery job includes a set of scheduled routines for the service component; and
in response to determining that the service component needs a recovery measure based on a result from the health check operation, invoking a recovery operation as part of executing the set of scheduled routines of the recovery job, wherein an implemented logic for the recovery operation is stored and executed at the service component.

2. The method of claim 1, wherein the recovery job includes execution parameters for the set of scheduled routines, the execution parameters including a job interval and a delay threshold value, wherein the delay threshold value defines a time period during which the recovery job execution awaits a response from the service component for the health check operation, and wherein the job interval defines a threshold period for invoking a subsequent recovery job corresponding to the invoked recovery job, and wherein a set of recovery jobs form a sequence of recovery jobs scheduled for periodic execution for the service component.

3. The method of claim 1, wherein the service instance runs as a first service instance of a set of service instances of a cloud service running at multiple cluster nodes of the cloud platform, and wherein recovery jobs scheduled for each of the set of service instances are scheduled and executed separately at corresponding runtime environments of the multiple cluster nodes of the cloud platform.

4. The method of claim 1, wherein the service instance including the one or more service components runs on a single virtualized runtime environment, and wherein the scheduling framework is deployed in the single virtualized runtime environment.

5. The method of claim 1, wherein the recovery job includes implemented logic for executing the scheduled routines at the scheduling framework, and wherein the implemented logic for executing the scheduled routines is decoupled from the logic implemented for executing the health check operation and the recovery operation at the service component.

6. The method of claim 1, wherein the recovery job includes a recovery configuration parameter defining a number of invocations of the health check operation that result in determining that the recovery measure is needed, before invoking the recovery operation.

7. The method of claim 1, wherein logic for execution of the health check operation is implemented at the service component.

8. The method of claim 1, wherein the one or more service components are registered at an auto-recovery job registry for monitoring of health statuses and execution of recovery operations by the scheduling framework, wherein the one or more service components include logic for execution of corrective auto-recovery measures at each corresponding service component.

9. The method of claim 8, wherein a service component from the one or more registered service components is unregistered at the auto-recovery job registry, and wherein the method further comprises, in response to unregistering of a service component, deleting scheduled recovery jobs for the service component at the scheduling framework.

10. The method of claim 1, wherein a registered service component is associated with a schedule for periodic monitoring for determining issues at the service component through invoking health check operations initiated from the scheduling framework.

11. A non-transitory, computer-readable medium coupled to one or more processors and having instructions stored thereon which, when executed by the one or more processors, cause the one or more processors to perform operations, the operations comprising:
scheduling one or more recovery jobs to be performed periodically for one or more registered service components included in a service instance running on a cluster node of a cloud platform, wherein each recovery job is associated with a corresponding service component of the service instance;
invoking a health check operation at a service component based on executing a recovery job at a scheduling framework corresponding to the service component, wherein the recovery job includes a set of scheduled routines for the service component; and
in response to determining that the service component needs a recovery measure based on a result from the health check operation, invoking a recovery operation as part of executing the set of scheduled routines of the recovery job, wherein an implemented logic for the recovery operation is stored and executed at the service component.

12. The non-transitory computer-readable medium of claim 11, wherein the recovery job includes execution parameters for the set of scheduled routines, the execution parameters including a job interval and a delay threshold value, wherein the delay threshold value defines a time period during which the recovery job execution awaits a response from the service component for the health check operation, and wherein the job interval defines a threshold period for invoking a subsequent recovery job corresponding to the invoked recovery job, and wherein a set of recovery jobs form a sequence of recovery jobs scheduled for periodic execution for the service component.

13. The non-transitory computer-readable medium of claim 11, wherein the service instance runs as a first service instance of a set of service instances of a cloud service running at multiple cluster nodes of the cloud platform, wherein recovery jobs scheduled for each of the set of service instances are scheduled and executed separately at corresponding runtime environments of the multiple cluster nodes of the cloud platform, wherein the service instance including the one or more service components runs on a single virtualized runtime environment, and wherein the scheduling framework is deployed in the single virtualized runtime environment.

14. The non-transitory computer-readable medium of claim 11, wherein the recovery job includes implemented logic for executing the scheduled routines at the scheduling framework, and wherein the implemented logic for executing the scheduled routines is decoupled from the logic implemented for executing the health check operation and the recovery operation at the service component.

15. The non-transitory computer-readable medium of claim 11, wherein the recovery job includes a recovery configuration parameter defining a number of invocations of the health check operation that result in determining that the recovery measure is needed, before invoking the recovery operation, and wherein logic for execution of the health check operation is implemented at the service component.

16. The non-transitory computer-readable medium of claim 11, wherein the one or more service components are registered at an auto-recovery job registry for monitoring of health statuses and execution of recovery operations by the scheduling framework, wherein the one or more service components include logic for execution of corrective auto-recovery measures at each corresponding service component, and wherein a registered service component is associated with a schedule for periodic monitoring for determining issues at the service component through invoking health check operations initiated from the scheduling framework.

17. A system comprising one or more computers and one or more storage devices on which are stored instructions that are operable, when executed by the one or more computers, to cause the one or more computers
to perform operations, the operations comprising:
scheduling one or more recovery jobs to be performed periodically for one or more registered service components included in a service instance running on a cluster node of a cloud platform, wherein each recovery job is associated with a corresponding service component of the service instance;
invoking a health check operation at a service component based on executing a recovery job at a scheduling framework corresponding to the service component, wherein the recovery job includes a set of scheduled routines for the service component; and
in response to determining that the service component needs a recovery measure based on a result from the health check operation, invoking a recovery operation as part of executing the set of scheduled routines of the recovery job, wherein an implemented logic for the recovery operation is stored and executed at the service component.

18. The system of claim 17, wherein the recovery job includes execution parameters for the set of scheduled routines, the execution parameters including a job interval and a delay threshold value, wherein the delay threshold value defines a time period during which the recovery job execution awaits a response from the service component for the health check operation, and wherein the job interval defines a threshold period for invoking a subsequent recovery job corresponding to the invoked recovery job, and wherein a set of recovery jobs form a sequence of recovery jobs scheduled for periodic execution for the service component.

19. The system of claim 17, wherein the service instance runs as a first service instance of a set of service instances of a cloud service running at multiple cluster nodes of the cloud platform, wherein recovery jobs scheduled for each of the set of service instances are scheduled and executed separately at corresponding runtime environments of the multiple cluster nodes of the cloud platform, wherein the service instance including the one or more service components runs on a single virtualized runtime environment, and wherein the scheduling framework is deployed in the single virtualized runtime environment.

20. The system of claim 17, wherein the recovery job includes implemented logic for executing the scheduled routines at the scheduling framework, and wherein the implemented logic for executing the scheduled routines is decoupled from the logic implemented for executing the health check operation and the recovery operation at the service component.

* * * * *